United States Patent Office 3,454,540
Patented July 8, 1969

1

3,454,540
ANTISTATIC PLASTIC COMPOSITIONS
James Stanley Clovis, Hatboro, Pa., assignor to Rohm & Haas Company, Philadelphia, Pa., a corporation of Delaware
No Drawing. Filed Mar. 12, 1965, Ser. No. 439,425
Int. Cl. C08f 37/06, 29/46
U.S. Cl. 260—86.1
9 Claims

ABSTRACT OF THE DISCLOSURE

Novel antistatic plastic compositions comprising an acrylic acid ester polymer and lithium perchlorate incorporated essentially uniformly throughout the resinous composition is provided. The composition is especially useful for the manufacture of phonograph records.

---

This invention relates broadly to new and useful antistatic plastic compositions. More particularly, this invention relates to antistatic plastic compositions comprising (1) a resinous or polymeric carbonyl-containing constituent which normally tends to accumulate static charges of electricity and (2) lithium perchlorate as an antistatic agent distributed or incorporated essentially uniformly in or throughout the resinous or polymeric constituent. Included within the scope of the present invention are articles cast directly from a polymerizable monomer, molding compositions and articles produced from said molding compositions.

In many types of molded articles the plastic material contained therein is one which normally tends to accumulate static charges of electricity. In the case of consumer items, this is objectionable, since it necessitates frequent wiping of the article to remove dust, and this in turn results in a further accumulation of a static charge. In the case of industrial articles, the inability of the plastic material to lose its electrical charge can be hazardous and can result, under conditions favoring the development of high electrical charge, in fires, explosions, electrical shock, etc. With other molded articles, for example with sound reproducing records and specifically phonograph records, the dust particles attracted by the accumulated static electricity create a more serious practical objection, since they cause surface noise and abrasion of the record and hence are one cause of poor tonal and reproducing qualities and shorter life of the record. Prior art attempts to solve these problems by surface treatment of the molded article with an antistatic agent have not been too successful, since the treatment is expensive, temporary, and involves an extra step or steps. Prior art attempts to include antistatic agents by mixing of such agents with molding powder have also not been too successful, since these antistatic agents are generally incompatible with the basic resin and, upon migration to the surface of an article formed from the molding composition, they are easily removed by frequent wiping or frequent use.

It is an object of the present invention to provide an antistatic plastic composition with substantially permanent antistatic properties.

It is also an object of this invention to provide an antistatic plastic composition in which the antistatic agent is fully compatible with the plastic or polymeric constituent as well as the monomeric constituent from which it is derived.

Another object of the invention is to provide an antistatic plastic composition in which the physical and chemical properties of the basic polymeric or resinous system are not altered or affected in any deleterious manner.

It is a further object of this invention to provide a

2 homogeneous and clear antistatic polymerized methyl methacrylate composition or copolymeric compositions based on methyl methacrylate, in various and diverse forms such as cast articles, molding powders, and molded articles.

The polymeric or resinous constituent contemplated by the present invention is, preferably, poly(methyl methacrylate) or a copolymer of methyl methacrylate, such as a copolymer of methyl methacrylate and ethyl acrylate, particularly copolymers of methyl methacrylate and ethyl acrylate containing at least 60% by weight of combined methyl methacrylate. These resins have exceptional optical clarity, permanence and weather resistance. It is one of the features of the present invention that the antistatic agent, lithium perchlorate, can be incorporated in the acrylic monomer mix, preferably by dissolving the lithium perchlorate in the monomer itself, and the mix thereafter polymerized so as to produce a product with the lithium perchlorate distributed in situ uniformly throughout the polymeric product without altering the desirable physical and chemical properties, particularly the optical properties, of the product. The acrylic product retains its exceptional clarity and, additionally, the abrasion resistance of the product is improved since it picks up or attracts less dust and dirt, thereby requiring fewer and less damaging cleaning operations. Another outstanding feature of the antistatic plastic composition of the present invention is the ease with which they can be extruded and molded, such as by injection molding, compression molding, and other well-known molding techniques. When the lithium perchlorate antistatic agent is incorporated in the polymer or resinous constituent in the above manner, the antistatic properties become essentially permanent. Other polymeric or resinous constituents which can be used in the present invention include carbonyl-containing polymers such as polyesters, polyamides, polycarbonates, polyvinyl acetate, etc.

With further reference to the polymeric or resinous constituent mentioned above, the term acrylic acid ester polymer as used herein refers to homopolymers and copolymers produced by polymerizing esters of acrylic acid or methacrylic acid, such as methyl acrylate, ethyl acrylate, propyl acrylate, isopropyl acrylate, butyl acrylate, hexyl acrylate, 2-ethylhexyl acrylate, and other lower alkyl acrylates wherein the alkyl group contains up to about 8 carbon atoms, methyl methacrylate, ethyl methacrylate, butyl methacrylate, hexyl methacrylate and other lower alkyl methacrylates containing up to about 8 carbon atoms in the alkyl group, also copolymers of the above-mentioned monomers, particularly copolymers containing a predominant proportion of methyl methacrylate, and blends of the above polymers. Methods of polymerizing and copolymerizing esters of acrylic acid and esters of methacrylic acid which are well known in the art may be used. These include bulk, solution, emulsion or suspension polymerization techniques. Catalysts or initiators that can be used include anions or, more preferably, free radical forming initiators such as lauroyl peroxide, 2,4-dichlorobenzoyl peroxide, azodiisobutyronitrile, benzoyl peroxide, acetyl peroxide, t-butyl peroxyisobutyrate, and others. Polymerization or copolymerization may be carried out at temperatures between about 40° C. and 150° C. with a free radical initiator in small concentrations, usually from about 0.01% to 3% based on the weight of the acrylic acid ester monomer.

Antistatic bulk polymerized articles, cast directly from a polymerizable acrylic monomer containing the lithium perchlorate antistatic agent, may be produced by pouring the monomer or a partially polymerized syrup into a suitably designed mold and completing the polymerization.

Articles such as sheet, rods or tubes may be produced in this manner. Further reference may be made to the procedures described in U.S. Patents Nos. 2,154,639 and 2,576,712 for the production of such articles.

Acrylic molding compositions for extrusion and injection molding are usually supplied as 1/8" pellets, while compression molding operations generally use beads having diameters of about 0.039 inch to about 0.007 inch (18 to 80 mesh size, U.S. Sieve Series). The antistatic acrylic molding compositions of this invention are preferably produced by conventional bulk polymerization methods followed by pulverizing or mechanical subdivision to the usual molding powder or granule sizes. If desired, pigments, colorants, plasticizers, stabilizers, etc. may be incorporated in the molding powders. Techniques for incorporation such additives are well known in the art and include such practices as blending powders with the selected colorant or other additive and homogenizing on heated differential two-roll mills, compound extruders, or similar powerful intensive mixers.

In practicing the present invention, the amount of lithium perchlorate antistatic agent which is utilized may be considerably varied, but it it is to be used in an antistatic effective amount. An antistatic effective amount is that amount which is sufficient to impart to the plastic material a half-life after charging of ten minutes or less. Generally, this amount is within the range of from about 0.1% to about 5% by weight of the acrylic resin or other plastic material. Other additives normally used in plastic compositions, such as plasticizers, fillers, pigments, dyes, stabilizers, etc. may also be incorporated as desired or as as conditions may require. The antistatic agent may be incorporated in the monomer by means of an inert carrier such as methanol or ethanol, or it may be more preferably dissolved directly in the monomer mix. This procedure eliminates the possibility of bubbles or imperfections in the case of castings.

The invention is further illustrated by reference to the following tables and examples. Parts and percentages are by weight unless otherwise stated.

TABLE I.—PROPERTIES OF BULK POLYMERIZED CAST SHEET OR SLAB

| Product Identification | Casting Formulation | Half-life after charging (in seconds) |
|---|---|---|
| A | Methyl methacrylate plus 2% LiClO$_4$ | 12, 11, 10. |
| B | Methyl methacrylate | 1 to 2 hrs. or more. |
| C | 90 pts. Methyl methacrylate, 10 pts. Ethyl acrylate plus 3½% LiClO$_4$. | 0. |

Samples of poly(methyl methacrylate) sheet, Product B—Table I above, give a charge dissipation half-life of one to two hours or more. Samples of poly(methyl methacrylate) sheet containing 2% by weight of LiClO$_4$ based on the weight of the methyl methacrylate, the LiClO$_4$ being dissolved in the monomer mix prior to polymerization, Product A—Table I above, give charge dissipation half-lives of the order of ten seconds. The data in Table I show for Sample A half-life determinations of 12, 11, and 10 seconds for three consecutive trials. Half-life is determined by vigorously rubbing the specimen with a paper tissue or rag until a substantially constant and maximum charge is reached, then removing the charging means and measuring the time in seconds that it takes for the charge to dissipate from its initial maximum value to one-half of its initial value. Product C of Table I, prepared by co-polymerizing a mixture of 90 parts of methyl methacrylate and 10 parts of ethyl acrylate with 3½ of LiClO$_4$, has a half-life of 0 second. Products A and C are perfectly clear and their optical properties compare favorably in all respects with the control, Product B.

In the examples provided below, molding powders and/or molded products prepared in accordance with the present invention are tested for antistatic behavior. In each instance, a methyl methacrylate (90 parts by weight) ethyl acrylate (10 parts by weight) copolymer prepared by conventional bulk polymerization of the monomers containing varying amounts of the antistatic agent is used.

The bulk polymerized material, in the case of Examples 1, 1a, 3, 3a, 4 and 4a below, is processed by vacuum-vented extrusion with a single pass through a 1" Killion extruder, then pelletized to form a molding powder of approximately 1/8" pellets suitable for extrusion and injection molding. In the case of Examples 2 and 2a below, the specimen is cut directly from a compression molded sheet.

TABLE II.—ANTISTATIC PROPERTIES OF MOLDED BARS

| | Composition [1] (by weight) | Specimen Details | Surface resistivity (ohms/square) (Room conditions, no special treatment) |
|---|---|---|---|
| Example: | | | |
| 1 | MMA-EA/90-10 plus 2% LiClO$_4$ | Injection Molded Bar [2] | $3.5 \times 10^{12}$ |
| 2 | MMA 100 parts plus 3.5% LiClO$_4$ | Specimen cut from compression molded sheet | $6.1 \times 10^{10}$ |
| 3 | MMA-EA/90-10 plus 3.5% LiClO$_4$ | Injection Molded Bar [2] | $3.2 \times 10^{12}$ |
| 4 | MMA-EA/90-10 | do | $3.0 \times 10^{13}$ to $1 \times 10^{14}$ |

[1] MMA is abbreviation for methyl methacrylate; EA is abbreviation for ethyl acrylate.
[2] Bar sample is 1/8" x 1/2" x 2½".

TABLE IIa.—ANTISTATIC PROPERTIES OF MOLDED BARS

| | Composition [1] (by weight) | Specimen details | (Specimens conditioned 5 days at 100% rel. humidity) | | Percent water absorption (based on room condition) |
|---|---|---|---|---|---|
| | | | Surface resistivity (ohms/sq.) | Static charge grounded to in volts, time in sec's. | |
| Example: | | | | | |
| 1a | MMA-EA/90-10 plus 2% LiClO$_4$ | Injection molded bar [2] | $5.0 \times 10^{13}$ | 3,000 to 0, 8 sec | 1.21 |
| 2a | MMA 100 parts plus 3.5% LiClO$_4$ | Specimen cut from compression molded sheet | $5.0 \times 10^9$ | None | 2.58 |
| 3a | MMA-EA/90-10 plus 3.5% LiClO$_4$ | Injection molded bar [2] | $7.0 \times 10^9$ | do | 2.60 |
| 4a | MMA-EA/90-10 | do.[2] | $7.0 \times 10^{13}$ | 2,000 to 400, 15 sec | 0.63 |

[1] MMA is abbreviated for methyl methacrylate; EA is abbreviated for ethyl acrylate.
[2] Bar sample is 1/8" x 1/2" x 2½".

From a comparison of the data presented in Table II it can be seen that the control, Example 4, which contains no antistatic agent, has a surface resistivity of the order of 10 to 1000 times higher or greater than the specimens of Examples 1, 2, and 3. Since antistatic behavior is essentially a surface phenomenon, the lower the surface resistivity of a product, the better are the antistatic properties. The results are more dramatic in the case of the data presented in Table IIa, which show that moisture or humidity enhances the full antistatic potential and behavior of the compositions. It is to be noted that the surface resistivity in the case of Example 4a is of the order of 100 to 10,000 times higher or greater than the specimens of Examples 1a to 3a. In the case of the specimens of Examples 2a and 3a, the grounding takes place substantially instantaneously; i.e., no appreciable static charge is built up, while in 1a the static charge of 3000 volts grounded to 0 in 8 seconds and the control, 4a, decreased from 2000 to 400 volts in 15 seconds.

In the manufacture of antistatic acrylic phonograph records employing the compositions of the present invention, the compression molding technique is preferably used. The compositions after being worked into a homogeneous mass at a suitable elevated temperature are formed into biscuits in conventional manner and thereafter the biscuits may be compression molded or pressed into records at temperatures ranging from about 325° F. to about 500° F. and pressures of from 1000 to 8000 pounds per square inch depending upon the type and size of the record to be produced. In an example, an acrylic copolymer consisting of 90 parts of methyl methacrylate and 10 parts of ethyl acrylate and 3½% lithium perchlorate (added to the monomer mix before copolymerization) is blended with 0.125% of carbon black. A biscuit of this composition is compression molded at a pressure of about 6000 p.s.i. and a temperature of 340–345° F. The molding cycle takes approximately 42 seconds. The phonograph record produced from the above composition exhibits antistatic properties. The antistatic properties of the records improve under conditions of normal use since the temperature and humidity conditions in the home or studio favor the development of full antistatic behavior. The example is repeated, except that a homopolymer of methyl methacrylate and 2% lithium perchlorate are used in the production of a phonograph or sound record. The record thus produced has good antistatic properties. (All parts and percentages above are given on a weight basis.)

Phonograph or sound records can also be produced from the antistatic composition of this invention by injection molding or by press embossing of a film or laminate of the material on a cardboard or other supporting backing.

I claim:

1. An antistatic plastic composition of matter comprising an acrylic acid ester polymer which would tend to accumulate a static charge and an antistatic effective amount of lithium perchlorate in the amount of approximately 0.1 to 5 percent based on the weight of the acrylic acid ester polymer incorporated essentially uniformly throughout the polymer.

2. The composition of claim 1 in which the acrylic acid ester polymer is poly(methyl methacrylate).

3. The composition of claim 1 in which the acrylic acid ester polymer is a copolymer of ethyl acrylate and methyl methacrylate, said copolymer containing at least 60% by weight of combined methyl methacrylate.

4. The composition of claim 1 in which the acrylic acid ester polymer is a copolymer of 90 parts by weight of methyl methacrylate and 10 parts by weight of ethyl acrylate.

5. A molded plastic article of manufacture comprising a copolymer selected from the group consisting of poly(methyl methacrylate) and a copolymer of methyl methacrylate and ethyl acrylate, said copolymer containing at least 60% by weight of combined methyl methacrylate, and an antistatic effective amount of lithium perchlorate.

6. A cast, optically clear, acrylic sheet comprising a polymer selected from the group consisting of poly(methyl methacrylate) and a copolymer of methyl methacrylate and ethyl acrylate, said copolymer containing at least 60% by weight of combined methyl methacrylate, and an antistatic effective amount of lithium perchlorate.

7. The cast, optically clear, acrylic sheet of claim 6 in which the lithium perchlorate is present in the amount of about 0.1 to 5% by weight based on the weight of the polymer present in said sheet.

8. An antistatic plastic molding composition in finely divided form, said composition comprising an acrylic acid ester polymer and an antistatic effective amount of lithium perchlorate.

9. An antistatic sound record having a sound track impressed therein, the portion of the record containing the sound track being made of a polymer selected from the group consisting of poly(methyl methacrylate) and copolymers of methyl methacrylate and ethyl acrylate, said copolymer containing at least 60% by weight of combined methyl methacrylate, and an antistatic effective amount of lithium perchlorate.

References Cited

UNITED STATES PATENTS

| | | | |
|---|---|---|---|
| 2,710,402 | 6/1955 | Rowe | 106—37 |
| 2,808,349 | 10/1957 | Melamed | 260—86.1 |
| 2,963,457 | 12/1960 | Miller. | |
| 3,239,494 | 3/1966 | Hodgdon | 260—88.7 |

HARRY WONG, Jr., *Primary Examiner.*

U.S. Cl. X.R.

161—250; 260—41, 75, 77.5, 78, 89.1, 89.5, 844